United States Patent
North

[15] 3,685,576
[45] Aug. 22, 1972

[54] PROCESS AND APPARATUS FOR FORMING TUBULAR THERMOPLASTIC FILM

[72] Inventor: Howard C. North, Westfield, N.J. 07090

[73] Assignee: Esso Research and Engineering Company

[22] Filed: Aug. 27, 1969

[21] Appl. No.: 853,381

[52] U.S. Cl. ..................................... 165/47, 18/14
[51] Int. Cl. ............................................. F24h 3/00
[58] Field of Search ........................... 18/14; 165/47

[56] References Cited

UNITED STATES PATENTS 3,486,554  12/1969  Mobius ........................ 165/47

Primary Examiner—Charles Sukalo
Attorney—Chasan and Sinnock and Harold Einhorn

[57] ABSTRACT

Cooling of extruded tubular film may be effected according to a novel technique wherein the film is counter-currently contacted with cooling liquid in a novel apparatus including a cooling cell having an annular passageway which permits passage of the film through e.g. a static zone, a quiescent zone, and a turbulent zone.

5 Claims, 2 Drawing Figures

Patented Aug. 22, 1972 3,685,576

PROCESS AND APPARATUS FOR FORMING TUBULAR THERMOPLASTIC FILM

This invention relates to a process and apparatus for forming tubular thermoplastic film. More specifically, it relates to a technique for preparing tubular thermoplastic film of polyolefins, such as polypropylene, of improved quality and at increased rate.

BACKGROUND OF THE INVENTION

As is well known to those skilled in the art, thermoplastic films may be prepared by extruding a body of film through an annular die to produce a tubular body of film which may then be cooled, slitted if desired, and thereafter further treated, e.g. subjected to axial orientation, to produce a product film suitable for use in packaging. The high speed extrusion and processing of this tubular film requires extreme care in handling; and it has not heretofore been possible to effect cooling at rates which are sufficiently high to permit fullest utilization and most effective operation of the extruding step and other portions of the process train. This has been so primarily because of the difficulties of mechanical handling of the film in the cooling steps.

For example, it has been found that the tubular film vibrates and ripples at the point at which it enters the cooling water bath; and this may cause imperfections in the film surface or, under very unfavorable conditions, actually rupture the film. It has also been found to be difficult to withdraw the film from the bath, the difficulty arising because the free flow of the film at this point is difficult to achieve while simultaneously effecting a water seal.

It is an object of this invention to provide a novel process and apparatus for forming tubular thermoplastic film. Other objects will be apparent to those skilled in the art from inspection of the following description.

SUMMARY OF THE INVENTION

In accordance with certain of its aspects, the novel process of this invention for forming a tubular thermoplastic film may comprise:

a. extruding a thermoplastic resin generally downwardly in the form of a molten, thermoplastic substantially tubular film body;

b. passing said film body downwardly around a cooling mandrel positioned in a cell containing a cooling liquid;

c. directing a cooling gas upwardly through an inside portion of said downwardly moving film body prior to contact with said mandrel thereby partially cooling and simultaneously expanding said film body to a diameter larger than the diameter of said mandrel and preventing the condensation of thermoplastic resin decomposition products on said mandrel at the point where the film contacts said mandrel;

d. sliding the inside surface of said partially cooled, expanded tubular film body downwardly over the outer surface of said cooling mandrel whereby the inside surface of said tubular film is maintained in contact with at least a portion of said mandrel by pressure exerted by the cell cooling liquid and is cooled through contact with said mandrel;

e. passing cooling liquid in said cell at high relative velocity in turbulent flow in contact with the outer surface of said film body thereby cooling said film body; and f. thereafter recovering said tubular film.

DESCRIPTION OF THE INVENTION

The thermoplastic resin which may be employed in practice of this invention may typically include polyethylene (low density or high density) and polypropylene. In practice of the process of this invention, solid polyolefin, typically crystalline polypropylene may be extruded, as in a screw-type extruder, at 200°–320° C., say 225° C. and 2,000 psig – 6,000 psig, say 4,000 psig through an annular die to yield a downwardly directed tubular film having an inside diameter of 6–48 inches, say 24 inches and a wall thickness (as it issues from the die) of 10 to 60 mils, say 25 mils. The downwardly moving molten sheet may be preliminarily contacted with air at 0°–60° C., say 20° C. to precool the film to 180°–280° C., say 200° C. Preferably, the air may contact the film both externally and internally, the air inside the film serving to support the film and to expand it to a larger diameter. Precooling may commonly be effected to an extent sufficient to achieve maximum polymer viscosity, but insufficient to generate a "frost-line" on the film prior to further cooling. Typically, polypropylene film may be precooled 180°–280° C., say 200° C. and polyethylene film may be precooled to 155°–235° C., say 175° C. at this point prior to further cooling.

The internal precooling gas may be passed upwardly (i.e. countercurrently) to the downwardly descending tubular film. As the gas contacts the inside of the tubular film, it may, in addition to precooling, serve to expand the film to a diameter slightly larger than that of the cylindrical mandrel used in subsequent steps. The internal precooling gas carries away undesired volatile products. The external precooling gas preferably passes cocurrent with the film, i.e. downwardly.

In practice of this invention, the precooled downwardly moving tubular film may be passed over and around a vertically extending mandrel which is completely surrounded by the film. The mandrel, typically of essentially cylindrical shape, may be formed of a composition, preferably metal, through which heat transfer may readily occur. The outside diameter of the mandrel may be 100–170 percent, say 130 percent of the diameter of the annular die. The outside diameter of the mandrel may be substantially the same as the inside diameter of the film whereby as the film passes downwardly thereover, cooling of the film may be effected.

Preferably, the mandrel may be internally cooled with cooling liquid, typically water entering at 2° – 75° C., say 10° C. and leaving at 4°–76° C., say 12° C. The major portion of the vertically extending circumferential wall of the mandrel may be cooled by circulating liquid as hereinafter set forth.

In accordance with the process of this invention, the inside surface of the downwardly descending tubular film may be maintained in slideable contact with at least a portion of the cylindrical surface of the mandrel as the film passes thereover and is cooled.

In practice of this invention, the outside surface of the downwardly descending tubular film passing over the mandrel may be passed through a body of cooling liquid, preferably water, at 2°–75° C., say 10° C. maintained in a cooling cell. The static pressure of the cooling liquid in the cell assists in maintaining the tubular film in contact with the mandrel.

It is a feature of the novel process of this invention that the cooling water in the cooling cell passes at high relative velocity countercurrently to the direction of flow of the tubular film. Typically, the tubular film may be passing downwardly at a velocity of 50–500 ft./min, say 300 ft./min. as it passes over the cooled surface of the mandrel and through the cooling cell. Preferably, the upward velocity of the cooling fluid may be 10–40 ft./min. say 20 ft./min. and the relative velocity may be sufficient to generate a turbulent flow of cooling fluid countercurrently contacting the tubular film. Typically, the relative velocity may be 60 – 530 ft./min, say 320 ft./min; and it will be apparent to those skilled in the art that this may be controlled by varying the velocity of the tubular film, the velocity of the cooling liquid, the density of the cooling liquid, the viscosity of the cooling liquid, and the thickness of the passageway through which the liquid flows, i.e. by controlling the effective Reynolds number at the area of contact to insure that turbulent flow is achieved.

Preferably, the process may be carried out so that cooling liquid contacts the tubular film typically at a point 2–4 inches above the point at which the film leaves the mandrel — and leaves the tubular film at about the point at which the film first contacts the mandrel.

The film may be withdrawn from the mandrel at a temperature of 5° – 80° C., say 30° C. It may be collapsed as by passage between pinch rolls and collected before further treatment which may include monoaxial or bi-axial orientation to yield a product particularly characterized by its ability to be used as packaging material.

In accordance with certain of its other aspects, this invention relates to a cooling cell, for containing cooling liquid, adapted to circumscribe an upstanding cylindrical mandrel over the cylindrical surface of which a thin tubular body may slidably move in a direction parallel to the main axis thereof from an inlet end to an outlet end thereof which comprises an upstanding outer wall adapted to circumscribe said mandrel and spaced from the cylindrical surface thereof; an upstanding inner wall within said outer wall adapted to circumscribe said mandrel and narrowly spaced from the cylindrical surface thereof, thereby forming an annulus immediately adjacent to and surrounding said mandrel wherein cooling liquid may move in turbulent flow over the outer surface of said tubular body; means for admitting cooling liquid to said cooling cell and to said annulus at the end thereof adjacent to the outlet end of said mandrel; and means for withdrawing cooling liquid from said annulus at the end thereof adjacent to the inlet end of said mandrel.

In accordance with certain of its more specific aspects, this invention is directed to a cooling cell for containing cooling liquid adapted to circumscribe an upstanding cylindrical mandrel over the cylindrical surface of which a thin tubular body may slideably move in a direction parallel to the main axis thereof from an inlet end to an outlet end thereof which comprises an upstanding outer wall circumscribing said mandrel and spaced from the cylindrical surface thereof; a laterally extending bottom wall joining said upstanding outer wall and terminating at an inner edge adjacent to said mandrel; resilient seal means on the inner edge of said bottom wall projecting therefrom toward said mandrel whereby said tubular body may pass between said mandrel and said seal means; an upstanding inner wall within said outer wall circumscribing said mandrel and narrowly spaced from the outer surface thereof, thereby forming an annulus immediately adjacent to and surrounding said mandrel wherein cooling liquid may move through a turbulent zone in turbulent flow over the outer surface of said tubular body; an upstanding outlet wall at said inlet end circumscribing said mandrel at a distance further therefrom than the distance of said upstanding inner wall and forming a quiescent zone adjacent to the end of said upstanding inner wall and said turbulent zone; and a laterally extending cover plate fitting over said upstanding outlet wall, defining therewith said quiescent zone, and terminating at a point closer to said mandrel than said upstanding inner wall, thereby forming a static zone through which said thin tubular body passes to said quiescent zone and said turbulent zone.

DESCRIPTION OF A PREFERRED EMBODIMENT

Figure 1:
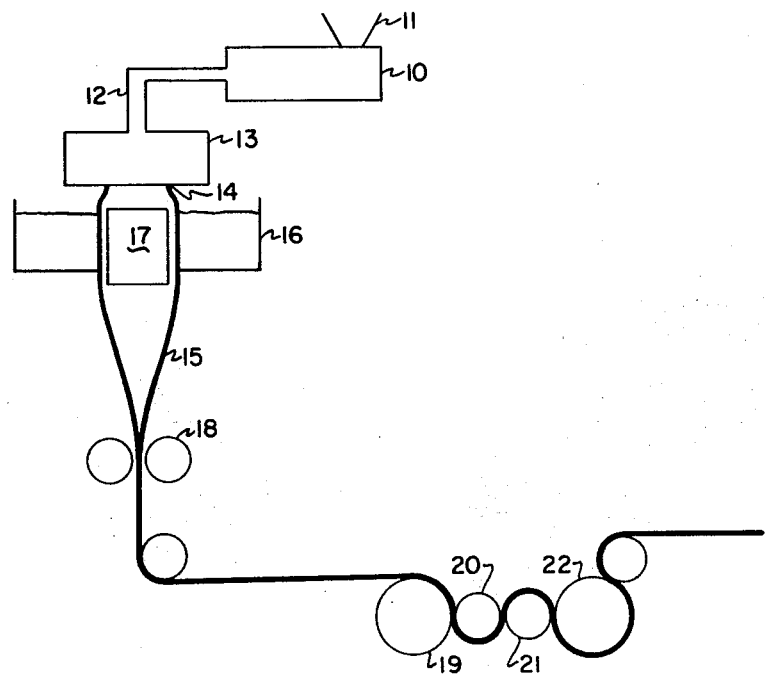

The novel process of this invention may be carried out in accordance with certain specific embodiments thereof, by the technique shown in the drawing wherein FIG. 1 shows an overall schematic view of the process and apparatus.

Figure 2:
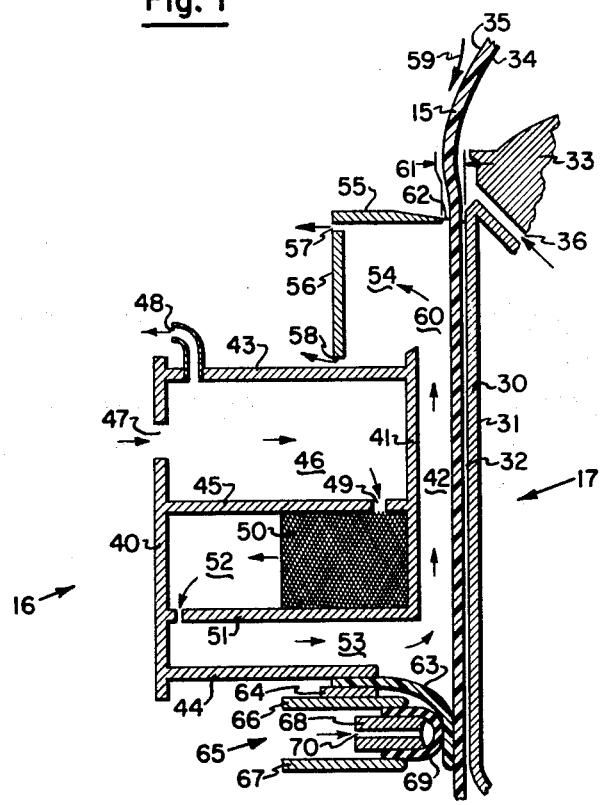

FIG. 2 shows, in detailed cross-section, a portion of the apparatus disclosed in FIG. 1.

In carrying out the process of this invention in accordance with FIG. 1 of the drawing, polyolefin may be admitted to screw extruder 10 through hopper 11 from which extrudate passes through conduit 12 and rotating or oscillating assembly including die 13 to annulus 14 form which it may be extruded as a tubular film 15. The film 15 is passed over mandrel 17 as the external surface of the film is cooled in cooling cell 16. The film may be collapsed by rolls 18 and thereafter subjected to further treatment. If it be desired, for example, to monoaxially orient the film, it may be heated on roll 19, stretched between stretch rolls 20 and 21, and cooled on roll 22.

In FIG. 2, there are shown details of a typical structure including the structure of the mandrel 17 and the cooling cell 16 of FIG. 1. In FIG. 2, tubular film 15 passes over mandrel 17 while simultaneously passing through cooling cell 16. Mandrel 17 includes, in this embodiment, cylindrical body portion 30 having inner wall 31 and outer wall 32. The mandrel 17 includes cover 33; and air inlet conduit 36 is positioned between at least certain portions of cover 33 and cylindrical body portions 30 of the mandrel. Film 15 includes inner surface 34 and outer surface 35. The cooling cell 16 may, in this embodiment, include a generally upstanding peripheral circumferential, preferably cylindrical, ring serving as outer wall 40 which defines the cell 16. Upstanding peripheral circumferential, preferably cylindrical, ring may serve as inner wall 41 typically mounted coaxially with respect to mandrel 17 thereby defining the annular channel 42. The inside diameter of ring 41 may be positioned with respect to the outside diameter of mandrel 17 to insure that annulus 42 is sized to permit turbulent flow of liquid therein. Extending between rings 40 and 41, which may be vertical (i.e. parallel to the axis of mandrel 17) in this embodiment, laterally extending top ring 43 and laterally extending bottom ring or wall 44 define the body portion of cooling cell 16. Bottom ring 44 may be considered a portion of an extension of ring 40, it being apparent that together they form the lower enclosing surfaces of the cell 16. Preferably mounted therebetween may be laterally extending baffle ring 45.

Top ring 43 and baffle ring 45 define plenum chamber 46 to which cooling liquid may be admitted through opening 47. Gas, including air, contained in liquid admitted through 47 may be discharged from slowly moving liquid in plenum chamber 46 and may exit through opening 48. De-aerated liquid in chamber 46 may exit therefrom through openings 49 and pass through packed bed 50, mounted on ring 51 preferably containing wire mesh, and thence into storage chamber 52.

From chamber 52, cooling liquid may pass through passageway 53 into annular channel 42. As liquid passes annular channel 42 at high velocity, it presses against the outer surface 35 forcing film 15 and inner surface 34 thereof against the outer wall 32 of mandrel 17. Upflowing liquid in the turbulent zone in channel 42 enters quiescent zone 60 adjacent to the point at which the film 15 first contacts mandrel 17 and thence passes through top chamber 54 defined by top ring 43, cover plate 55, and outlet wall or ring 56. Cover plate 55 is positioned to permit the upper level of liquid in top chamber 54 to be at a point slightly above the point of initial contact between film 15 and mandrel 17.

It is a particular feature of the novel top section including top chamber 54 that it includes upper port 57 and lower port 58. In the preferred embodiment 30–90 percent, preferably 65 percent of the cooling liquid passes through lower port 58 and 10–70 percent, preferably 35 percent of the cooling liquid passes through upper port 57. When these conditions prevail and the liquid level is at the lower base of cover plate 55 (i.e., touching the cover plate), there is no disturbance of the water surface (which is substantially free of exposed surface) by the downwardly directed air 59 coming from the air ring not shown. Furthermore, there is a lower liquid velocity in quiescent zone 60 where the molten web 15 contacts the cooling liquid. The molten web is stabilized by viscous damping as it passes through the narrow liquid static zone or column 61 in the gap between cover plate 55 and film 15.

Liquid may be maintained in cooling cell 16 by exit seal 63. Exit seal 63, typically of teflon, may be mounted between bottom ring 44 and clamping ring 64 and may slideably bear against film 15. Exit seal 63 may be fixed in position by sealing assembly 65 including upper support ring 66, and lower support ring 67. Mounted therebetween may be pressure ring holder 68 containing pressure ring 69 (preferably of thin rubber), the holder 68 and having conduit 70 through which fluid, typically air, may be forced to urge pressure ring 69 against seal 63 and film 15, thus providing a snug fit between seal 63, film 15 and mandrel 17.

In accordance with a preferred embodiment of this invention, crystalline polypropylene having a density of 0.92 a melt flow of 10–12, and an isotacticity of 94–96 may be passed at a rate of 600 pounds/hour through screw extruder 10 from hopper 11. Extrudate formed at 4,000 psig and 225° C may be extruded through rotary head 13. Head 13 may rotate about a vertical axis at a velocity of 2–4 rpm. Annulus 14 may be an orifice with an internal diameter of 24 inches with an annular opening of 25 mils; and tubular film 15, at the point of formation may have the noted dimensions.

The tubular film, leaving the die at 15 ft./min. and moving downwardly at a linear velocity increasing to 300 ft./min. at the mandrel, may be contacted with downwardly directed air at 20° C. to precool the film to about 200° C.

The precooled film may be passed over a mandrel, which in this embodiment includes a metal cylinder of about 10 inches in height and a diameter of 30 inches. The mandrel may be cooled internally with cooling water entering at 10° C. and leaving at 15° C. As the downwardly moving tube of polypropylene passes over the surface 32 of the mandrel 17, it is contacted on the outer surface 35 thereof by cooling water in a cooling cell 16.

Cooling cell 16 may include a cylindrical ring 40, of internal diameter of about 40 inches, and a height of about 5 inches serving as the outerwall 40 which defines the cell 16. The inner wall 41 of the cell may be about 4 inches high. The annular channel 42 defined by the inner wall 41 and the film 15 may be 0.25–1.5 inches, preferably 0.5 inches in this embodiment. Entrained gas, typically air, admitted with cooling water at 10° C., entering through opening 47 may be withdrawn through vent 48. Cooling water in an amount of 6.5 ft.³/min., passing through plenum chamber 46, defined by top ring 43 and baffle ring 45 may be admitted to packed bed 50 and thereafter to storage chamber 52 and passageway 53.

Cooling water may leave passageway 53 and enter annular channel 42 wherein it moves upwardly in turbulent flow at a velocity of 20 ft./min. Annular channel 42, defined by ring 41 and tube 15 may be 0.5 inches across, i.e. annular radius — the distance from ring 41 to tube 15.

Cooling water passing through annular channel 42 enters quiescent zone 60 wherein the velocity of the cooling water may drop to 7 ft./min. because of the termination of the upper extremity of ring 41. Zone 60 may be bounded at its upper extremity by cover plate 55 which, in this embodiment, may be 2 inches above top ring 43. The width of top chamber 54 may be 1-4 inches, but in this embodiment it is preferably 1.5 inches. Cooling water passes through top chamber 54 and exits therefrom through lower port 57 and upper port 58. Preferably 65 percent of the cooling water exits through lower port 58 and 35 percent exits through upper port 57 where, in this embodiment, upper port 57 was 0.0625 inches and lower port 58 was 0.010 inches in diameter. Control of the degree of turbulence in quiescent zone 60 and in top chamber 54 may be effected by varying the proportion of water exiting through each of ports 57 and 58. Variation may be effected by proper sizing of ports 57 and 58, by moving ring 56 upwardly or downwardly. As smaller proportions of liquid pass through lower port 58, the zone 60 becomes less quiescent; and as larger proportions of liquid pass through lower port 58, the zone 60 becomes more quiescent. Water exits at temperature of 30° C.

Cover plate 55, mounted to define top chamber 54, may be spaced from film 15 by a small gap 61 typically 0.03 – 0.30 inch, in this embodiment 0.063 inch. The thickness of the cover plate 55, at the point of closest approach to mandrel 17, may be less than about 0.125 inch, and in this embodiment 0.0625 inch. The height of the static zone or narrow liquid column 62 may typically be up to 0.125 inch.

As descending film 15 passes downwardly over mandrel 17 it is stabilized and freed of ripples as it passes through static zone 61. It may then be initially cooled in quiescent zone 60 before being passed through turbulent zone 42. At the lower portion of zone 42, it may leave the cooling cell 16 by passing through exit seal 63, a Teflon seal, maintained in place by pressure ring 69.

The film 15 may leave the cooling cell 16 at temperature of 35° C. and be flattened at pinch roll 18 and thereafter recovered, if desired as cast polypropylene to yield a film which is suitable for packaging.

Although this invention has been described with reference to a specific embodiment, it will be apparent to those skilled in the art that various changes and embodiments may be made therein which clearly fall within the scope of this invention.

What is claimed is:

1. A cooling cell, for containing cooling liquid, in combination with a mandrel over the surface of which a thin tubular body may slidably move in a direction parallel to the main axis thereof from an inlet end to an outlet end thereof which comprises an upstanding outer wall adapted to circumscribe said mandrel and spaced from the surface thereof; an upstanding inner wall within said outer wall adapted to circumscribe said mandrel and narrowly spaced from the surface thereof thereby forming an annulus immediately adjacent to an surrounding said mandrel wherein cooling liquid may move in turbulent flow over the outer surface of said tubular body; means for admitting cooling liquid to said cooling cell and to said annulus at the end thereof adjacent to the outlet end of said mandrel; and means for withdrawing cooling liquid from said annulus at the end thereof adjacent to the inlet end of said mandrel.

2. The cooling cell of claim 1 wherein:
said means for admitting cooling liquid includes a laterally extending bottom wall joining said upstanding outer wall and terminating at an inner edge adjacent to said mandrel, and resilient seal means connected with the inner edge of said bottom wall and projecting therefrom toward said mandrel whereby said tubular body may pass between said mandrel and said seal means; and b. said means for withdrawing cooling liquid includes an upstanding outlet wall at said inlet end for said tubular body and circumscribing said mandrel at a distance further therefrom than the distance of said upstanding inner wall, and a laterally extending cover plate fitting over said upstanding outlet wall and terminating at a point closer to said mandrel than said upstanding inner wall; said cover plate, outlet wall, and said mandrel defining therebetween a quiescent zone.

3. The cooling cell of claim 2 wherein said outlet wall includes an upper port and a lower port; said lower port being adapted to allow a predetermined volume of cooling liquid to pass therethrough with the remaining liquid passing through said upper port.

4. A cooling cell for containing cooling liquid which comprises an annular body having:
a. a laterally extending bottom wall terminating at an inner edge;
b. resilient seal means connected with said inner edge and projecting inwardly therefrom;
c. a first upstanding wall operably connected to said bottom wall;
d. inlet means for admitting cooling liquid to said cooling cell and directing said liquid to the lower interior surface of said first upstanding wall; said inlet means including said bottom wall and said seal means;
e. a second upstanding wall at least partially above and operably connected to said first upstanding wall and at a distance disposed outward of said first upstanding wall, both upstanding walls being considered in relation to the inner edge of said bottom wall;
f. a laterally extending cover plate fitting over said second upstanding wall and terminating at a point inward of said first upstanding wall; said cover plate and said second upstanding wall defining and forming a top chamber; and
g. outlet means for withdrawing cooling liquid from said top chamber and said cooling cell.

5. The cooling cell of claim 4 wherein said outlet means comprises an upper port and a lower port, said ports being contained in said second upstanding wall, with said lower port being adapted to allow a predetermined volume of cooling liquid to pass therethrough, the remaining liquid passing through said upper port.

* * * * *